United States Patent Office 3,536,890
Patented Oct. 27, 1970

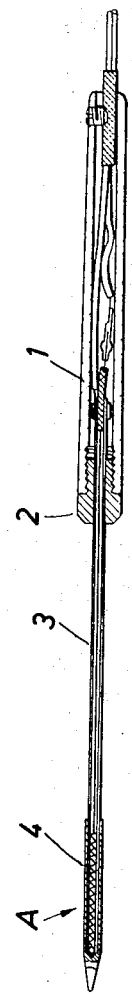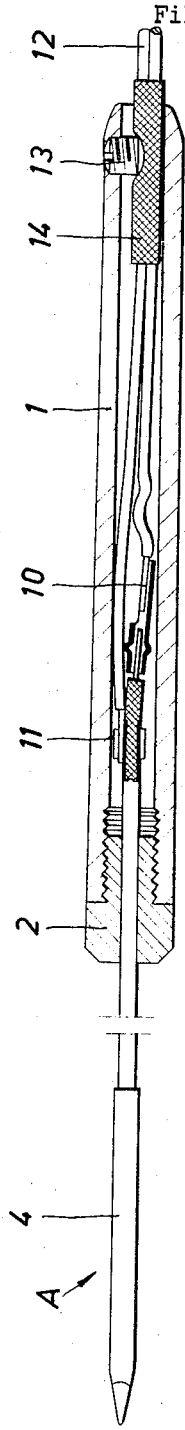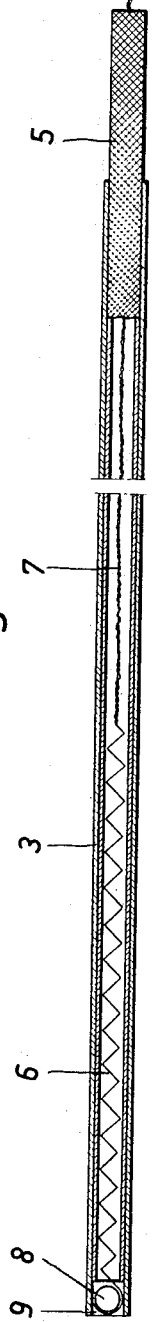

3,536,890
MINIATURE SOLDERING IRON
Friedrich Hombrecher, Wertheim (Main), Germany, assignor to ERSA Ernst Sachs KG, Wertheim (Main), Germany
Filed Aug. 1, 1967, Ser. No. 657,639
Claims priority, application Germany, Sept. 1, 1966, E 32,405
Int. Cl. H05b 3/42; B23k 3/02
U.S. Cl. 219—238                                   7 Claims

ABSTRACT OF THE DISCLOSURE

A miniature soldering iron formed by a carrier tube having a soldering tip at one end and a handle at the other end and lined with a heat resistant, flexible, woven hose made of fiber glass and containing a heating coil positioned at the soldering tip end of the tube. The carrier tube may be of the capillary type having an inside diameter of about 1 mm. and a maximum outside diameter of 1.5 mm. The soldering tip fits over the end of the carrier tube and has a maximum outside diameter of 2 mm. The fiber glass hose may have a relaxed diameter greater than the inside diameter of the carrier tube which, upon being stretched, reduces so that it fits easily into the tube. A connecting wire extends from the heater coil into the handle where it is connected to a cable leading from a source of power.

A method of lining carrier tubes, for use in miniature soldering irons, with flexible woven hose of heat resistant material comprised of the steps of securing a slender rigid needle-like member, having a diameter smaller than the inside diameter of the carrier tube, to the flexible hose; inserting the guide member into and through the carrier tube; exerting a pulling force on the guide member thereby reducing the diameter of the woven hose as required and pulling the guide member and its attached hose through the carrier tubes.

SUMMARY OF THE INVENTION

This invention is directed to miniature soldering irons employing low voltage and, more particularly, it is concerned with the use of a stretchable flexible, woven, heat resistant hose as an insulating liner for the carrier tube of a miniature soldering iron.

Up until the present time, one of the problems encountered in miniature soldering irons has been the inability to reduce the diameter of the soldering tip below a certain dimension principally because the materials used for insulation could not be effectively shaped below that dimension. In the past, the tube of the soldering iron was insulated from the heater coil by means of a wound mica sleeve. However, this kind of insulation presents a problem because mica cannot be wound over a mandrel whose diameter is less than 2 to 2.5 mm.

In miniature soldering irons operated at a low voltage, such as 6 v., a thin ceramic tube has been used as the insulation within the carrier tube, and below a certain diameter the ceramic tube is no longer practical because it is too delicate.

Due to the difficulties encountered in reducing the diameter of the insulation within an internally heated miniature soldering iron, it has not been possible to employ a carrier tube for the soldering iron having a diameter of less than 3 mm. though in present day modern micro soldering operations such a size is desirable.

Accordingly, the present invention is directed to a minature soldering iron utilizing a very thin carrier tube which may be characterized as a capillary tube, that is, one having an inside diameter of about 1 mm. and a maximum outside diameter of 1.5 mm. over which a soldering tip having a maximum outside diameter of 2 mm. can be inserted. Though the necessity for reducing the size of the carrier tube has been well known there have been no suggestions for an alternative type of insulation which would permit such a reduction.

In the present invention, a woven fiber glass hose is utilized to permit a reduction in the size of the carrier tube because of the ductility due to its weave, the fiber glass hose can be pulled through a thin carrier tube having an inside diameter of about 1 mm. to line its entire inner surface. The stretched fiber glass hose provides a heat resistant insulation for the entire length of the carrier tube replacing the previously employed mica sleeve and ceramic tube. Under the action of a tensile force exerted upon it, the fiber glass hose will stretch and its outside diameter will be reduced accordingly. In assembling the soldering iron, the fiber glass hose lines the entire length of the carrier tube and extends into the handle at one end of the tube. While the fiber glass hose provides a simple means for insulating the entire length of the carrier tube, its use also affords a simple and economical process for assembling the soldering iron.

When the hose is pulled through the carrier tube it stretches and automatically adapts itself to the inside diameter of the tube though its relaxed diameter may be slightly larger. Because of its ductility or the ability of the hose to reduce its diameter, there is, in turn, a reduced wall friction between the hose and the carrier tube. As a result, the hose can be pulled through the carrier tube without any considerable tension or stress being employed on it. When the hose is positioned within the tube and the tensional stress on it is released, the hose will closely line the inside wall because of its natural elasticity and an opening will be provided through the hose for the insertion of the self-supporting heater coil.

The primary object of the present invention is to utilize an insulating liner for the carrier tube of a miniature soldering iron which permits the reduction in the carrier tube diameter of the soldering iron over that which has been known to be used.

Another object of the present invention is to employ a flexible woven fiber glass hose as the insulating liner for the carrier tube whereby the ability of the hose to stretch and reduce its diameter permits its easy insertion and installation within the carrier tube though the tube may be characterized as having a very narrow or capillary-type bore.

A further object of the present invention is to provide a simple and inexpensive means for assembling miniature soldering irons employing a flexible woven hose as the insulating liner for the carrier tube.

Still another object of the present invention is to reduce the size of the miniature soldering iron to employ a soldering tip having a maximum diameter of 2 mm.

Therefore, the present invention is directed to a miniature soldering iron formed by a carrier tube having a soldering tip secured at one end and a handle at its opposite end. To permit the reduction in the diameter of the carrier tube and the soldering tip over that which has been known in the prior art, a stretchable flexible woven hose made of a heat resistant material, such as fiber glass, is used to line the interior of the carrier tube. The hose provides an insulation between the carrier tube and a heating coil positioned at its soldering tip end and also for the connecting wire which extends from the heating coil into the handle. Due to the use of the flexible woven hose, the diameter of the carrier tube may be reduced to a maximum outside diameter of 1.5 mm. and an inside diameter of 1.0 mm., which in turn allows a soldering tip having a maximum outside diameter of 2.0 mm. to be easily fitted onto the tube.

In addition, to permitting the reduction in the diameter of the carrier tube of a miniature soldering iron, the use of the flexible woven hose provides a simple and inexpensive method for assembling the carrier tube and heating coil of the soldering iron. The flexible hose is secured to a needle-like guide member which is pulled through the carrier tubes, the ability of the woven tube to stretch and reduce its diameter makes its insertion through the tubes quite simple. A considerable number of carrier tubes can be threaded onto the hose and by proper spacing the hose can be cut leaving the assembled tube and hose ready for the insertion of the heater coil and its connecting wire and then for the assembly of the soldering tip and the handle onto the tube.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWINGS

In the drawings:

FIG. 1 is a longitudinal sectional view, approximately in actual size, of a miniature soldering iron embodying the present invention;

FIG. 2 is an enlarged view of the soldering iron shown in FIG. 1;

FIG. 3 is a still further enlarged view, at a magnification of about five times actual size, of the carrier tube of the soldering iron illustrated in FIG. 2 with the soldering tip removed; and FIG. 4 is an illustration of a section of flexible woven fiber glass hose attached to a guide member for use in assembling the hose into a carrier tube in accordance with the present invention.

DESCRIPTION OF THE PREFERRED EMBODIMENTS

In FIG. 1, a miniature soldering iron A is shown in its actual size and comprises a carrier tube 3 secured at one end to a handle 1 by means of a screw connection 2 and at its other end having a soldering tip 4 which fits over the tube. As can be seen in FIG. 1, the carrier tube 3 has a very thin bore and may be characterized as a capillary tube. Preferably, the carrier tube is formed of a hard drawn alloy steel tube. The tube 3 has an inside diameter of about 1 mm. and a maximum outside diameter of 1.5 mm. The soldering tip 4 which fits over the end of the carrier tube has a maximum outside diameter of 2 mm. and preferably is made of copper. Providing an insulating liner for the interior of the carrier tube is a stretchable flexible woven fiber glass hose 5 having an additional portion extending from the tube at its handle end. In its relaxed condition the hose has a diameter slightly larger than the inside diameter of the carrier tube, but when it is stretched its diameter is reduced so that it fits within the carrier tube.

Positioned within the hose, in the carrier tube, is a heater coil 6, located at the soldering tip end of the tube, and a connecting wire, reinforced with additional pure nickel wires, extends from the heater coil through the hose 5 into the handle 2. The heater coil 6 has a relatively small diameter since it can be wound on a mandrel having a diameter of about 0.3 mm. As illustrated in FIG. 3, the fiber glass hose 5 is inset at the soldering tip end of the carrier tube a distance approximately equal to the inside diameter of the carrier tube. Inserted into this end of the carrier tube is a metal ball 8 which fixes the end position of the heater coil 6. The heater coil 6 is hard soldered to the metal ball 8 and to the carrier tube 3 at the location indicated by the reference numeral 9 in FIG. 3. The ball serves as a stopper and fixes the position of the heater coil in the end of the tube. Due to its point contact with the heater coil, the metal ball is insertable into the tube more easily than other types of stoppers and, because of its curvature, it leaves sufficient room for soldering the coil to the ball and to the tube.

The heater coil 6 is positioned within the soldering tip portion of the carrier tube and its connecting wire extends from that point back through the hose within the carrier tube and into the handle 2, and as mentioned above, it is reinforced with pure nickel wires. Within the handle, the connecting wire 7 is secured by soft soldering to a terminal 10 and to a second terminal 11 attached to the carrier tube. A cable 12 from a source of power, not shown, extends into the handle and is secured to the terminals 10 and 11. Any tension which might develop in the cable 12 is relieved by means of a set screw 13 which secures the cable securely in place at its point of entry into the handle.

In FIG. 4, an insertion member is shown for threading the fiber glass hose through the carrier tubes. The insertion member comprises a needle or needle-like guide 15 to which the fiber glass hose 5 is secured, as by gluing, at point 16. The flexible and ductile characteristics of the hose provide a conically-shaped surface at its position of attachment 16 to the guide which assists in its insertion into the carrier tube. The needle is of a diameter sufficiently smaller than the carrier tube so that it can be easily inserted through the tube. In the event the hose has a diameter slightly larger than the inside diameter of the carrier tube, the hose will stretch as the needle is pulled through the carrier tube so that it will reduce in size sufficient to permit it to line the interior of the tube. When the total number of carrier tubes are threaded onto the hose, the tubes can be spaced apart and the hose cut providing a combined section of carrier tube and hose with a portion of the hose 5 extending from the carrier tube as displayed in FIG. 3. The remaining assembly steps can then be performed.

In the assembly of miniature soldering irons, according to the present invention, it is possible to thread the fiber glass hose 5 through as many as 100 individual carrier tubes 3 on a single pass. In the insertion step, the carrier tubes 3 are serially arranged with their ends in contact with each other. The fiber glass hose 5 is secured to the slender rigid needle-like guide 15 which has a diameter less than that of the inside diameter of the carrier tube. With the guide secured to it, the hose is unwound from a spool as the guide is introduced through the carrier tubes. At its point of attachment to the guide the hose has a conical shape which facilitates its entrance into the tubes. Once the guide passes through a carrier tube the fiber glass hose can be easily pulled through it due to the stretching characteristic of the hose weave. During this tube lining operation, the guide and its attached fiber glass hose may be threaded through a multiple number of the tubes until the total length of hose exceeds the total length of the carrier tubes. The carrier tubes are then spaced apart providing a length of fiber glass hose extending between adjacent carrier tubes. The hose is cut between carrier tubes providing a length of hose protruding from at least one end of the tube. Next the guide can be removed from the end of the hose and secured to another length of hose to repeat the process.

What is claimed is:

1. A miniature soldering iron comprising a carrier tube having a narrow bore therethrough, said carrier tube having a maximum outside diameter of 1.5 mm. and an inside diameter in said bore of about 1.0 mm., a flexible woven hose formed of fiber glass lining the interior of said carrier tube, said hose being stretchable in the longitudinal direction for reducing its diameter and having a normal relaxed outside diameter greater than the diameter of said bore whereby it is easily insertable into said carrier tube and when the stretching action is discontinued said hose tends to return to its original diameter and forms an electrically insulating lining on the interior of said carrier tube, a soldering tip fitted on one end of said tube, and an electric heater coil disposed within said hose and located at the soldering tip end of said tube.

2. A miniature soldering iron, as set forth in claim 1, wherein said carrier tube is formed of a hard drawn alloy steel.

3. A miniature soldering iron as set forth in claim 2, wherein said soldering tip is made of copper and has a maximum outside diameter of 2.0 mm.

4. A miniature soldering iron as set forth in claim 1, wherein the end of said flexible hose is inset from the soldering tip end of said carrier tube by a distance about equal to the inside diameter of said tube, and a metal ball is inserted into the end of said tube, and one end of said heater coil is integrally electrically connected to said ball and to said carrier tube.

5. A miniature soldering iron as set forth in claim 4, wherein said heater coil is hard soldered to said metal ball and said carrier tube.

6. A miniature soldering iron, as set forth in claim 1, wherein a handle is connected to the opposite end of said carrier tube from said soldering tip end, said carrier tube being electrically conductive, a connecting wire extending through said flexible hose from one end of said heater coil into said handle, the other end of said coil being electrically connected to said tube, a pair of terminals located within said handle, one of said terminals being electrically connected to said carrier tube, the other said terminal being secured to said connecting wire, and means for connecting said terminals to a source of power.

7. A miniature soldering iron as set forth in claim 6, wherein nickel wires are wound with said connecting wire to afford reinforcement therefor.

References Cited

UNITED STATES PATENTS

| | | | |
|---|---|---|---|
| 2,746,138 | 5/1956 | Smith | 29—452 X |
| 2,939,099 | 5/1960 | Morey | 338—243 |
| 3,093,723 | 6/1963 | Adamson | 219—238 |
| 1,772,616 | 8/1930 | Ruhl. | |
| 2,366,910 | 1/1945 | Kollath | 219—238 |
| 2,485,496 | 10/1949 | Korsgren et al. | 338—271 X |
| 2,714,651 | 8/1955 | Wotton | 219—239 |
| 2,898,571 | 8/1959 | Moule et al. | 338—271 X |

FOREIGN PATENTS 828,004    2/1960    Great Britain.

OTHER REFERENCES

Sachs, German application 1,101,642, published March 1961.

ANTHONY BARTIS, Primary Examiner

U.S. Cl. X.R.

29—452; 219—229, 534; 338—243, 271